US012578049B2

(12) United States Patent
Rainey

(10) Patent No.: US 12,578,049 B2
(45) Date of Patent: Mar. 17, 2026

(54) SUBSEA PIPELINE REMEDIATION HEATING

(71) Applicant: Salamander IP Holdings LLC, Hamilton (BS)

(72) Inventor: Robert Michael Rainey, Cypress, TX (US)

(73) Assignee: Salamander IP Holdings LLC, Hamilton (BM)

( * ) Notice: Subject to any disclaimer, the term of this patent is extended or adjusted under 35 U.S.C. 154(b) by 444 days.

(21) Appl. No.: 18/124,020

(22) Filed: Mar. 21, 2023

(65) Prior Publication Data

US 2024/0247747 A1 Jul. 25, 2024

Related U.S. Application Data

(60) Provisional application No. 63/439,890, filed on Jan. 19, 2023.

(51) Int. Cl.
*F16L 53/38* (2018.01)
*F16L 59/02* (2006.01)
(Continued)

(52) U.S. Cl.
CPC ............. *F16L 53/38* (2018.01); *F16L 59/026* (2013.01); *F16L 59/07* (2013.01); *F16L 59/123* (2013.01); *F16L 59/15* (2013.01); *F17D 3/01* (2013.01)

(58) Field of Classification Search
CPC ...... E21B 36/003; E21B 36/005; F16L 53/35; F16L 53/38
See application file for complete search history.

(56) References Cited

U.S. PATENT DOCUMENTS 4,338,045 A 7/1982 Cour
5,714,738 A * 2/1998 Hauschulz .............. F16L 53/35
219/535

(Continued)

FOREIGN PATENT DOCUMENTS

EP 3420263 B1 * 7/2020 ............. H05B 6/108
GB 2582322 9/2020
(Continued)

OTHER PUBLICATIONS

Patent Cooperation Treaty, PCT/US2023/083784, International Search Report and Written Opinion, May 10, 2024.
(Continued)

*Primary Examiner* — Kenneth Rinehart
*Assistant Examiner* — Haotian Lu
(74) *Attorney, Agent, or Firm* — Jones Day

(57) ABSTRACT

Systems and methods are provided for insulating and heating a subsea pipeline. A system may comprise a subsea pipeline including a lower portion embedded in a seafloor and an upper portion above the seafloor. The system may include an insulating layer. The insulating layer may include a middle portion covering the upper portion of the subsea pipeline. The insulating layer may further include an end portion covering the seafloor. The insulating layer may form a cavity adjacent to the seafloor, the subsea pipeline, and the insulating layer. The system may further include a plurality of heater cables within the cavity. The plurality of heater cables may be configured to heat a fluid within the subsea pipeline. The plurality of heater cables may be separated from the subsea pipeline only by seawater or by soil of the seafloor within the cavity.

21 Claims, 9 Drawing Sheets

104

502

501

503

102

101

(51) Int. Cl.

| | | |
|---|---|---|
| *F16L 59/07* | (2006.01) | |
| *F16L 59/12* | (2006.01) | |
| *F16L 59/15* | (2006.01) | |
| *F17D 3/01* | (2006.01) | |

(56) References Cited

U.S. PATENT DOCUMENTS

| | | | |
|---|---|---|---|
| 6,939,082 B1 * | 9/2005 | Baugh ................... | B08B 7/0071 |
| | | | 405/145 |
| 6,955,221 B2 | 10/2005 | Bursaux | |
| 10,533,683 B2 * | 1/2020 | Espinasse ............... | B08B 9/027 |
| 2010/0154917 A1 * | 6/2010 | Batallas ................ | F16L 59/143 |
| | | | 138/146 |
| 2013/0213487 A1 | 8/2013 | Qu et al. | |
| 2014/0183180 A1 | 7/2014 | Watakabe et al. | |
| 2017/0030503 A1 | 2/2017 | Faulkner et al. | |
| 2019/0346078 A1 | 11/2019 | Almerico | |

FOREIGN PATENT DOCUMENTS

| | | | | |
|---|---|---|---|---|
| WO | WO-2010135772 A1 * | 12/2010 | ............. | F16L 53/37 |
| WO | WO 2017/143389 A1 | 8/2017 | | |

OTHER PUBLICATIONS

Patent Cooperation Treaty, PCT/US2023/083784, International Preliminary Report on Patentability, Jul. 31, 2025.

* cited by examiner

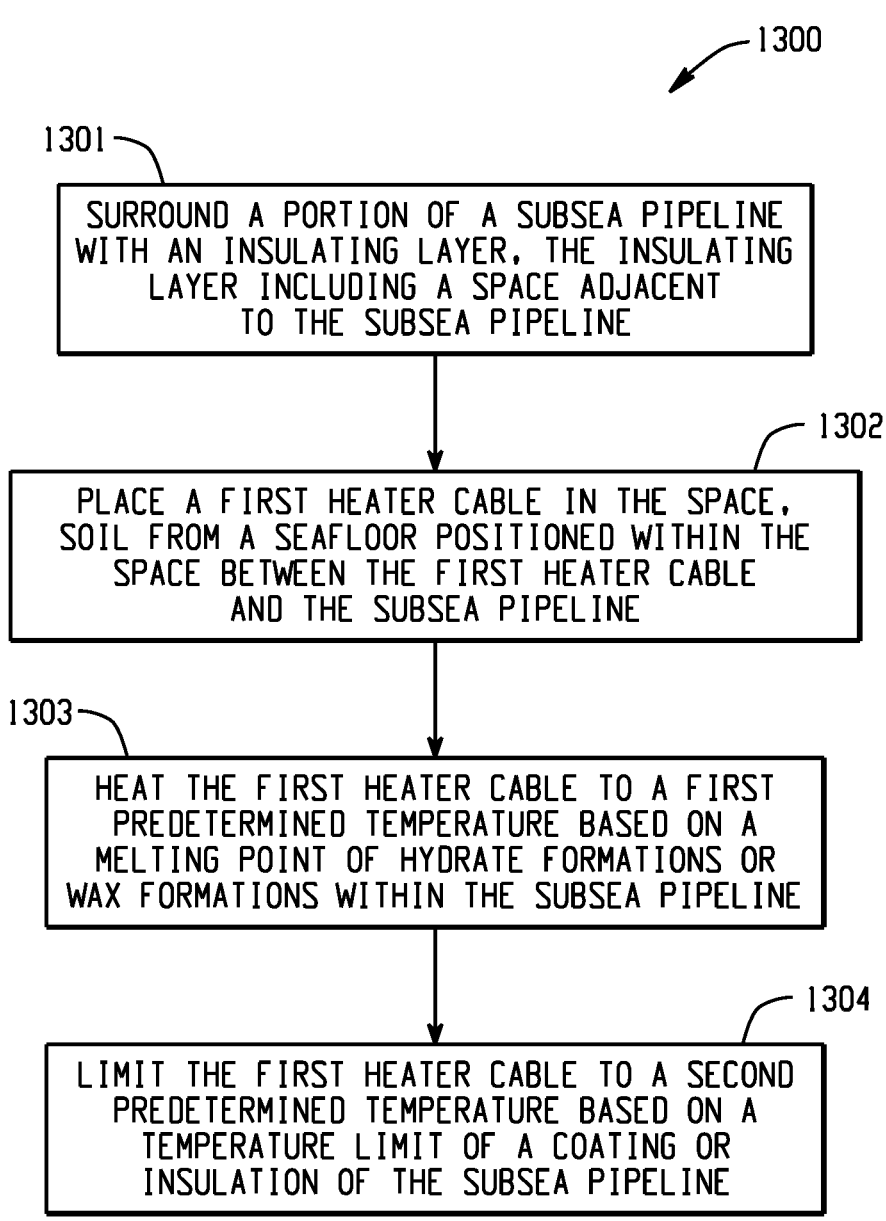

1300

1301

SURROUND A PORTION OF A SUBSEA PIPELINE
WITH AN INSULATING LAYER, THE INSULATING
LAYER INCLUDING A SPACE ADJACENT
TO THE SUBSEA PIPELINE

1302

PLACE A FIRST HEATER CABLE IN THE SPACE,
SOIL FROM A SEAFLOOR POSITIONED WITHIN THE
SPACE BETWEEN THE FIRST HEATER CABLE
AND THE SUBSEA PIPELINE

1303

HEAT THE FIRST HEATER CABLE TO A FIRST
PREDETERMINED TEMPERATURE BASED ON A
MELTING POINT OF HYDRATE FORMATIONS OR
WAX FORMATIONS WITHIN THE SUBSEA PIPELINE

1304

LIMIT THE FIRST HEATER CABLE TO A SECOND
PREDETERMINED TEMPERATURE BASED ON A
TEMPERATURE LIMIT OF A COATING OR
INSULATION OF THE SUBSEA PIPELINE

Fig. 13

SUBSEA PIPELINE REMEDIATION HEATING

CROSS-REFERENCE TO RELATED APPLICATIONS

This application claims priority to U.S. Provisional Application 63/439,890, filed Jan. 19, 2023, which is incorporated herein by reference in its entirety.

FIELD

The present disclosure relates to insulation and heating of subsea oil and natural gas pipelines.

BACKGROUND

Crude oil, natural gas, and water are often located in reservoirs beneath a seafloor. Subsea oil wells can be used to drill and extract the contents of the reservoirs. Pipelines (e.g., flowlines) can be used to transport the crude oil, natural gas, and water from the subsea oil well to an offshore platform, where it can be divided into separate quantities of crude oil, natural gas, and water. The crude oil and natural gas may be shipped to land through export pipelines, where they can be processed and subsequently used in various products (e.g., gasoline). "Subsea pipelines" may refer to the flowlines used to transport the contents of the subsea reservoir to the offshore platform, the export pipelines utilized to transport the crude oil and natural gas to land, as well as any other pipeline used to transport subsea substances. Hydrate or wax formations may form within the subsea pipelines. Such formations may form, for example, due to a relatively cold seawater temperature (e.g., approximately 4 degrees Celsius). The hydrate or wax formations may impede the flow of crude oil, natural gas, or other substance within the subsea pipelines. Heat may be applied to the subsea pipelines to reduce the presence of hydrate and wax formations. Existing systems of heating the subsea pipelines are cumbersome and inefficient. Therefore, there is a need in the art for systems and methods which efficiently apply and distribute heat to subsea pipelines and slow the heat from dissipating into the surrounding seawater.

SUMMARY

An example insulation cover may be configured to surround a subsea pipeline. The insulation cover may comprise a first side portion and a second side portion. Each of the first side portion and the second side portion may include a lower end configured to extend into a seafloor and an upper end configured to be positioned above the seafloor. The insulation cover may further include a top portion extending between the upper end of the first side portion and the upper end of the second side portion. The top portion and the first side portion may form a first cavity, and the top portion and the second side portion may form a second cavity. A plurality of heater cables may be positioned at an interior of the insulation cover.

The insulation cover may further comprise a plurality of heater cable brackets configured to secure one or more of the plurality of heater cables to an inner surface of the insulation cover. The plurality of heater cable brackets may include a heater cable bracket at the lower end of the first or second side portions configured to be embedded in the seafloor. The plurality of heater cable brackets may include a heater cable bracket positioned in the first cavity and a heater cable bracket positioned in the second cavity. The plurality of heater cables may be configured to exceed a first predetermined temperature and limited to a second predetermined temperature. The first predetermined temperature may be based on a melting point of hydrate or wax formations within the subsea pipeline and the second predetermined temperature may be based on a temperature limit of a coating or insulation of the subsea pipeline. An outer surface of one or more of the plurality of heater cable brackets may be positioned a second predetermined distance from an outer surface of the subsea pipeline. The second predetermined distance may form a region of heated water between the outer surface of the heater cable bracket and the outer surface of the subsea pipeline.

An example system comprises a subsea pipeline including a lower portion embedded in a seafloor and an upper portion above the seafloor. The system may further include an insulating layer including a middle portion covering the upper portion of the pipeline. The insulating layer may further include an end portion covering the seafloor. The insulating layer may form a cavity adjacent to the seafloor, the pipeline, and the insulating layer. The system may further comprise a plurality of heater cables in the cavity that are configured to heat a substance within the subsea pipeline.

The middle portion of the insulating layer may comprise a plurality of bottom notches permitting the middle portion to conform to the upper portion of the subsea pipeline. The end portion of the insulating layer may comprise a plurality of notches permitting the insulating component to bend from the upper portion of the subsea pipeline to the seafloor. The insulating layer may comprise a plurality of lamination layers. The system may further comprise a stake configured to secure the insulating layer to the seafloor. The stake may include a first end positioned on a top of the insulating layer and a second end embedded in the seafloor. The system may further comprise a top securing element configured secure the insulting layer to the subsea pipeline. The top securing element may be placed through the insulating layer and into the subsea pipeline. The insulating layer may not include a conductive layer. The insulating layer may comprise a plurality of baffled chambers capable of being inflated and deflated. The baffled chambers may be filled with nitrogen when the baffled chambers are inflated.

An example method comprises surrounding a portion of a subsea pipeline with an insulating layer that includes a space adjacent to the subsea pipeline. The method may comprise placing a first heater cable in the space. Soil from a seafloor may be positioned within the space between the first heater cable and the subsea pipeline. The method may further comprise heating the first heater cable to a first predetermined temperature based on a melting point of hydrate formations or wax formations within the subsea pipeline. The method may further comprise limiting the first heater cable to a second predetermined temperature based on a temperature limit of a coating or insulation of the subsea pipeline.

The method may further comprise placing a second heater cable in the cavity. The second heater cable may be placed a predetermined distance from the first heater cable. The predetermined distance between the first heater cable and the second heater cable forming a heating chamber adjacent to the subsea pipeline. The heating chamber may prevent overheating of an outer coating of the subsea pipeline. The method may further comprise inflating a plurality of baffled chambers within the insulating layer. The method may further comprise surrounding the insulating layer with a rubber cover and securing the insulating layer to the subsea pipeline by attaching a cable weight to the rubber cover.

BRIEF DESCRIPTION OF THE DRAWINGS

The following detailed description will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

FIG. 13 depicts a method, in accordance with some embodiments.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art.

Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Subsea pipelines can be used to transport natural gas, crude oil, and water from an offshore oil and gas well to an offshore platform, as well as from the offshore platform to land. Hydrates or wax formations can form within the subsea pipelines which can clog or halt production. Solutions to remove these hydrate or wax formations from the subsea pipelines can be impractical, expensive, and inefficient. Systems and methods of the present disclosure are presented for removing hydrate and wax formations efficiently and at a reduced cost. Embodiments of the present disclosure may be applicable to both newly installed and existing subsea pipelines. A heating and insulation system may be lowered to the sea floor to cover a designated segment of the subsea pipeline and heat the pipeline and its contents sufficiently to remove the hydrate or wax formations.

Figure 1:
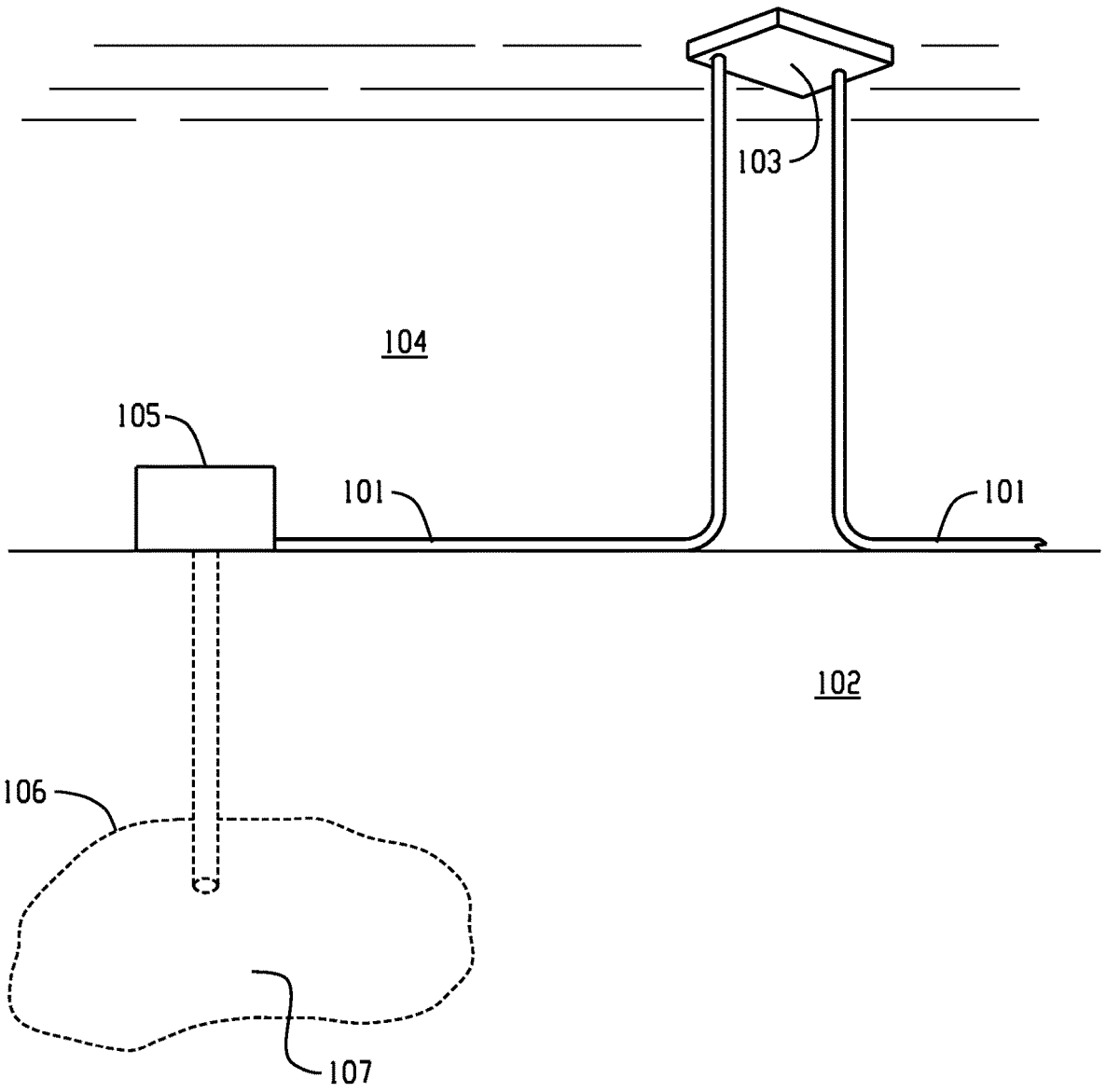
FIG. 1 depicts a subsea oil and gas extraction system, in accordance with some embodiments.

FIG. 1 depicts a subsea oil and gas extraction system, in accordance with some embodiments. In the example embodiment depicted in FIG. 1, a subsea pipeline 101 (e.g., a flowline) may be used to transport contents 107 of a subsea reservoir 106 (e.g., natural gas, crude oil, and water) from a subsea oil and gas well 105 to an offshore platform 103. The offshore platform 103 may be used to divide the contents 107 of the subsea reservoir 106 into separate quantities of crude oil, natural gas, and water. A subsea pipeline 101 (e.g., an export pipeline) may then be used to transport the natural gas and crude oil from the offshore platform 103 to land (not shown), where it can be utilized in various products. Alternatively, the offshore platform 103 can also be utilized to drill and extract the natural gas and crude oil 107 from a subsea reservoir 106 (e.g., through a casing pipe). "Subsea pipelines" may refer to the flowlines used to transport the contents of the subsea reservoir to the offshore platform, the export pipelines utilized to transport the crude oil and natural gas to land, as well as any other pipeline used to transport subsea substances. The seawater 104 surrounding the subsea pipelines 101 may be relatively cold (e.g., about 4 degrees Celsius). This temperature surrounding the fluid within the subsea pipelines 101 may contribute to the accumulation of wax and hydrates within the subsea pipelines 101. The accumulation of these wax and hydrate formations can slow the flow of fluid within the subsea pipelines 101. Systems and methods are presented herein for heating and insulating the subsea pipelines 101 and the fluid within them to mitigate, prevent, or eliminate the buildup of wax and hydrates.

Figure 2:
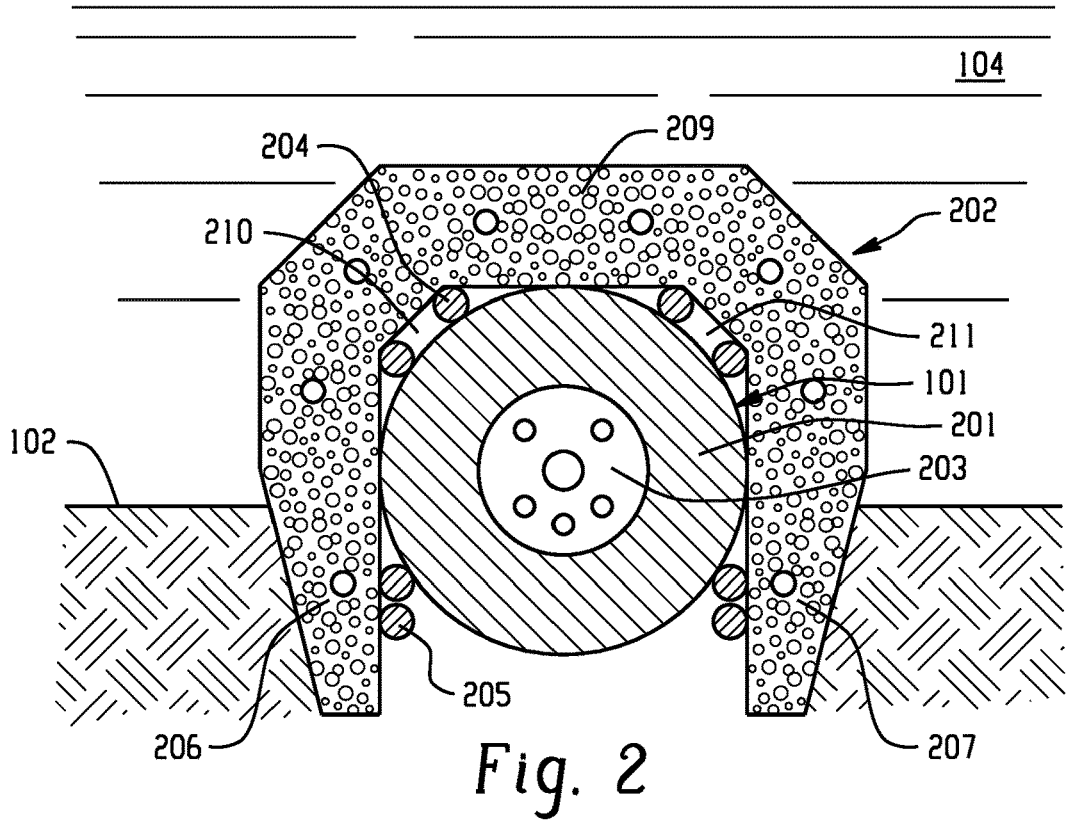
FIG. 2 depicts a cross section of a subsea pipeline with an inverted trough insulation cover, in accordance with some embodiments.

FIG. 2 depicts a cross section of a subsea pipeline with an inverted trough insulation cover, in accordance with some embodiments. The subsea pipeline 101 may be partially buried in the seafloor 102. The subsea pipeline 101 may include an outer layer 201. The outer layer 201 of the subsea pipeline 101 may be composed of a conductive material (e.g., stainless steel) and may be relatively thick, as shown in FIG. 2. The inverted trough insulation cover 202 may include a first side portion 206 and a second side portion 207. The first and second side portions (206, 207) may each include a lower end that extends into the seafloor 102 and an upper end that is above the seafloor 102. The lower end of the first and second side portions (206, 207) extending into the seafloor 102 may provide a barrier between the subsea pipeline 101 and the seawater 104 and thus prevent heat losses (e.g., convection heat losses) from seawater movement into or out of an area surrounding the subsea pipeline 101.

The inverted trough insulation cover 202 may further include an upper portion 209 that is connected to the upper ends of the first and second side portions (206, 207) and may be positioned above the seafloor. The upper portion 209 and first side portion 206 may form a first cavity 210 between the flowline 101 and the inverted trough insulation cover 202 when the inverted trough insulation cover 202 is placed over the subsea pipeline 101. Furthermore, the upper portion 209 and the second side portion 207 may form a second cavity 211 between the pipeline 101 and the inverted trough insulation cover 202 when the inverted trough insulation cover 202 is placed over the flowline 101.

The subsea pipeline 101 with an inverted trough insulation cover 202 may include one or more heater cables (204, 205). For a buried pipeline 101 with the inverted trough insulation cover 202, the locations of the heater cables (104, 105) may be placed a sufficient distance apart from one another to form a heated chamber of adequate surface area than can allow injected heat to flow through the outer layer 201 of the pipeline 101 without overheating it. In the example embodiment depicted in FIG. 2, the subsea pipeline 101 with the inverted trough insulation cover 202 includes top heater cables 204 and bottom heater cables 205. The top heater cables 204 may be spaced apart from one another but may simultaneously be in very close contact with the outer layer 201. The space between these top heater cables 204 may be filled with stagnant water. This space between the pair of top heater cables 204 in the first cavity 210 and the space between the pair of top heater cables 204 in the second cavity 211 may effectively act as a heating pad that increases the contact area between the heat source (e.g., the top heater cables 204) and the heat sink (e.g., the subsea pipeline 101).

The heat generated from these concentrated heating areas may penetrate insulation of the subsea pipeline 101 in less time than heat generated by a single heater cable. The space between the heater cables (204, 205) may be limited to a distance at which heat from the heater cables (204, 205) would overheat insulation or a coating of the subsea pipeline 101. The first and second cavities (210, 211) may thus eliminate the need for a conductive layer surrounding the outer layer 201 of the subsea pipeline 101 to assist in heating.

The top heater cables 204 may be placed along the top side of the subsea pipeline 101 at roughly 45 degrees clockwise and counterclockwise, respectively, from a vertical line that runs through the center of the pipeline 101. In the example embodiment of FIG. 2, the heater cables (204, 205) may be placed on the subsea pipeline 101 and the inverted trough insulation cover 202 may be subsequently lowered onto the subsea pipeline 101 and the heater cables (204, 205). A gap may be placed between the heater cables (204, 205) to provide for higher heat injection while extending the time before reaching the maximum temperature of the subsea pipeline 101. The heater cables (204, 205) may be routed in pairs to aid in installation and provide a concentrated heat injection location at each segment of the pipeline 101 on which they are installed.

The bottom pair of heater cables 205 may be located at or below the midline and near the pipeline 101. The insulation from the first and second side portions (206, 207) may be placed on the side of and below the bottom pair of heater cables 205. This arrangement may prevent heat from circumventing the first and second side portions (206, 207) and leaving to the sea. The bottom of the first and second side portions (206, 207) placed in the seafloor 102 may also prevent or mitigate convection heat loss from seawater movement into or out of the area enclosed by the inverted trough insulation cover 202. Heating the seafloor 102 as an intermediary medium between the heater cables (204, 205) and the pipeline 101 may allow higher heat injection prior to reaching the temperature limits of the outer layer 202 of the subsea pipeline 101. Thus, the bottom heater cables 205 may result in the transfer of heat into the subsea pipeline 101 by convection. The heater cables (204, 205) may be wired in a split-phase circuit configuration. For example, the heater cables (204, 205) may be wired to include two split-phase circuits (e.g., one split-phase circuit on each side of the subsea pipeline 101). Each split-phase circuit may generate two-thirds of the heat generated by a single three-phase circuit. Thus, two split-phase circuits may provide approximately one-third higher heat generation than one standard three-phase circuit configuration.

The thick conductive outer layer 201 of the subsea pipeline 101 may be utilized to distribute heat from one or more heater cables (204, 205) into an interior 203 of the subsea pipeline. Furthermore, distribution of heat into the subsea pipeline 101 using systems and methods described herein may involve limiting the temperature concentration generated by the heater cables (204, 205). For example, a corrosion-resistant coating may surround the subsea pipeline 101 and may have a predetermined temperature limit. Using the conductive outer layer 202 to distribute heat to the subsea pipeline 101 may prevent the corrosion-resistant coating from exceeding this predetermined temperature limit. Furthermore, the heater cables (204, 205) may be limited to a predetermined temperature based on a temperature limit of a coating or insulation of the subsea pipeline 101.

Figure 3:
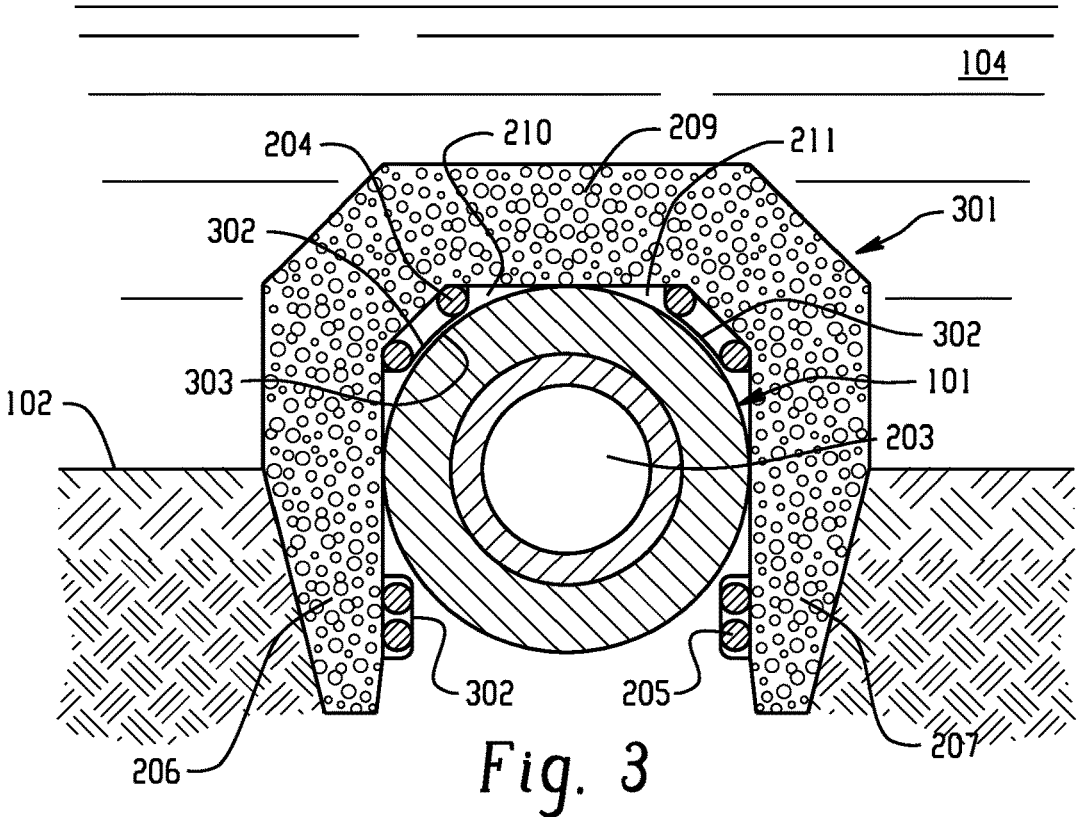
FIG. 3 depicts a cross section of a subsea pipeline with an inverted trough insulation cover having heater cable brackets, in accordance with some embodiments.

FIG. 3 depicts a cross section of a subsea pipeline with an inverted trough insulation cover having heater cable brackets, in accordance with some embodiments. The inverted trough insulation cover having heater cable brackets 301 depicted in FIG. 3 may be substantially similar to the inverted trough insulation cover 202 depicted in FIG. 2, with the exception of the added heater cable brackets 302. The heater cable brackets 302 may be used to secure the heater cables 204 to an internal surface of the inverted trough insulation cover 301. The heater cables 204 may be placed at opposite ends of each of the heater cable brackets 302. A heater cable bracket 302 may be placed in each of the first cavity 210 and the second cavity 211.

A small gap 303 may be provided between an outer surface of the heater cable brackets 302 and an outer surface of the subsea pipeline 101. The heat generated during operation of the heater cables 204 may heat the heater cable brackets 302 and the space within the heater cable brackets 302 between the heater cables 204. Furthermore, a layer of heated seawater may form between the outer surface of the heater cable brackets 302 and the subsea pipeline 101. The gap 303 between the heater cable brackets 302 and the subsea pipeline 101 may thus act as a heating layer which distributes heat into the subsea pipeline 101 over a larger surface area than would be possible by the use of a single heater cable without a heater cable bracket 302. The subsea pipeline with an inverted trough insulation cover having heater brackets 301 may further include heater cable brackets 302 used to secure one or more lower heater cables 205 to the lower end of the first and second side portions (206, 207). Heat generated along an outer surface of these heater cable brackets 302 by the lower heater cables 205 may be injected into the subsea pipeline through the seafloor 102.

Figure 4:
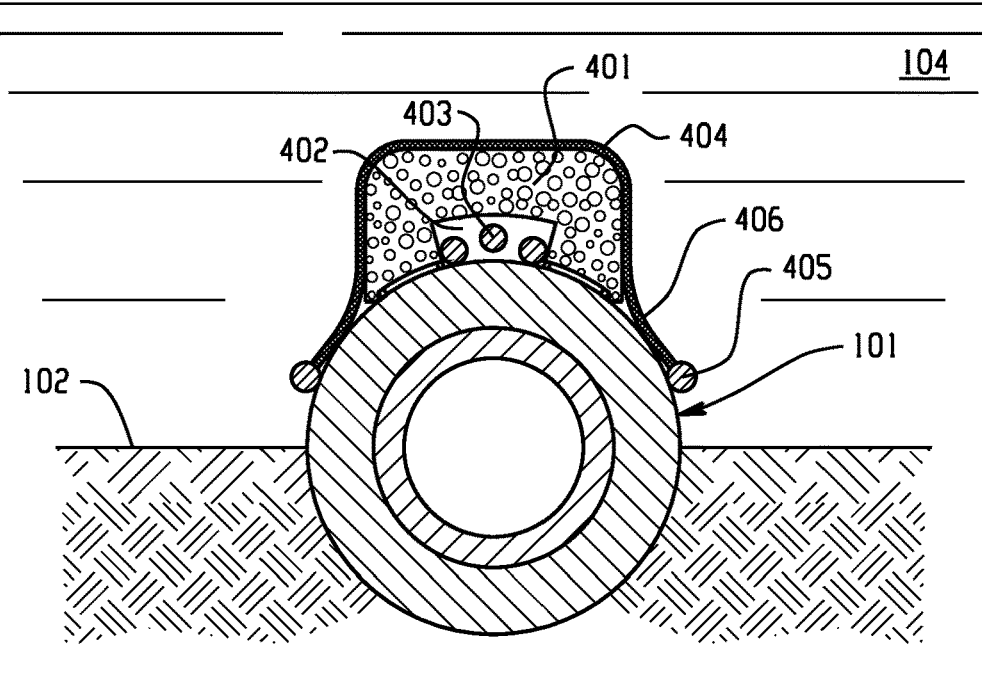
FIG. 4 depicts a cross section of a subsea pipeline with a covering insulation cap, in accordance with some embodiments.

FIG. 4 depicts a cross section of a subsea pipeline with a covering insulation cap, in accordance with some embodiments. In the example embodiment shown in FIG. 2, the covering insulation cap 401 is placed on top of the subsea pipeline 101. The covering insulation cap 401 may be composed of, for example, syntactic foam. As discussed above, the subsea pipeline 101 may be partially embedded within the seafloor 102. The covering insulation cap 401 may include a lower cavity 402 adjacent to the top of the subsea pipeline 101. One or more heater cables 403 may be placed within the lower cavity 402 on top of the subsea pipeline 101. A cover (e.g., a rubber cover) 404 may be placed around the covering insulation cap 401. The cover 404 may include side portions 406 extending down the side of the subsea pipeline 101. The side portions 406 may be attached to cable weights 405 at or near the side of the subsea pipeline 101. The cable weights 405 may be used to secure the covering insulation cap 401 to the subsea pipeline 101. In some example embodiments, heater cables are used as the cable weights.

Figure 5:
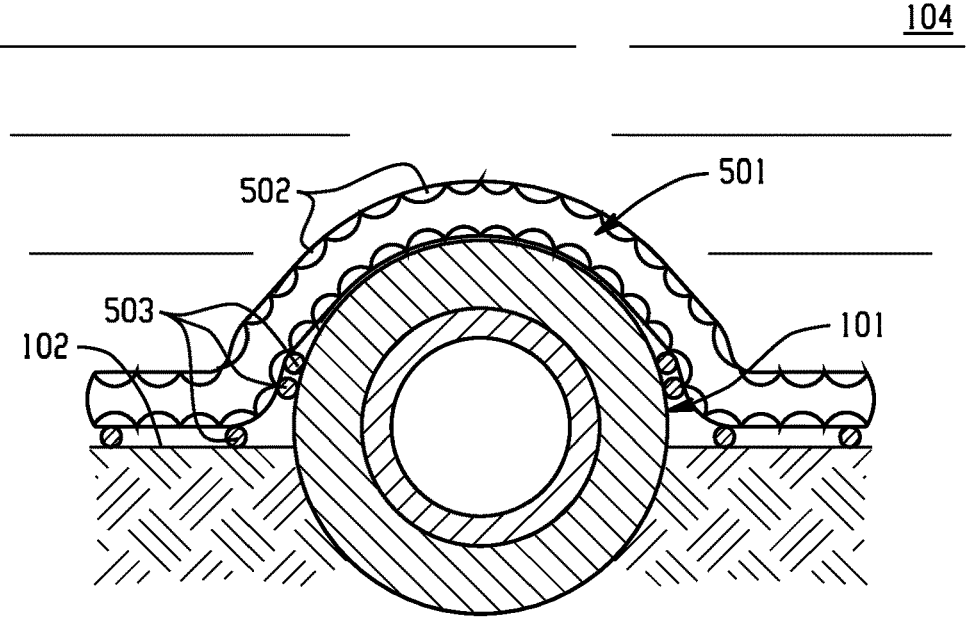
FIG. 5 depicts a cross section of a subsea pipeline with an inflatable insulation cover, in accordance with some embodiments.

FIG. 5 depicts a cross section of a subsea pipeline with an inflatable insulation cover, in accordance with some embodiments. In the example embodiment depicted in FIG. 5, the inflatable insulation cover 501 is constructed from a flexible material (e.g., plastic or foam) and includes a plurality of baffled chambers 502 with a hollow interior. The baffled chambers 502 may be filled with a gas having low thermal conductivity (e.g., nitrogen). The gas may be inserted (e.g., injected) into the baffled chambers 502 after the inflatable insulation cover 501 is installed. This may allow for simple installation and storage. For example, the baffled chambers 502 may not be filled during their storage prior to installation and during installation. This may be advantageous during storage and installation because the inflatable insulation cover 501 may occupy less area. After the inflatable insulation cover 501 is installed on the subsea pipeline 101, subsea remote operated vehicles (not shown) may inject the low-thermal conductivity gas into the baffled chambers 502 and inflate the inflatable insulation cover 501. The baffled chambers 502 may be inflated to a higher pressure than would be required at sea level to overcome the external hydrostatic pressure provided by the seawater 104 surrounding the subsea pipeline 101. However, the differential pressure realized by the baffled chambers 502 may still be relatively low based on their internal pressure.

As discussed above, the subsea pipeline 101 may be partially embedded in the seafloor 102. A middle portion of the inflatable insulation cover 501 may cover a top of the subsea pipeline 101. Side portions of the inflatable insulation cover 501 may cover a top surface of the seafloor 102. One or more heater cables 503 may be installed under the inflatable insulation cover 501. One or more heater cables 503 may be placed, for example, under the inflatable insulation cover 501 at a point at which the top portion of the inflatable insulation cover 501 meets with the side portions of the inflatable insulation cover.

Figure 6:
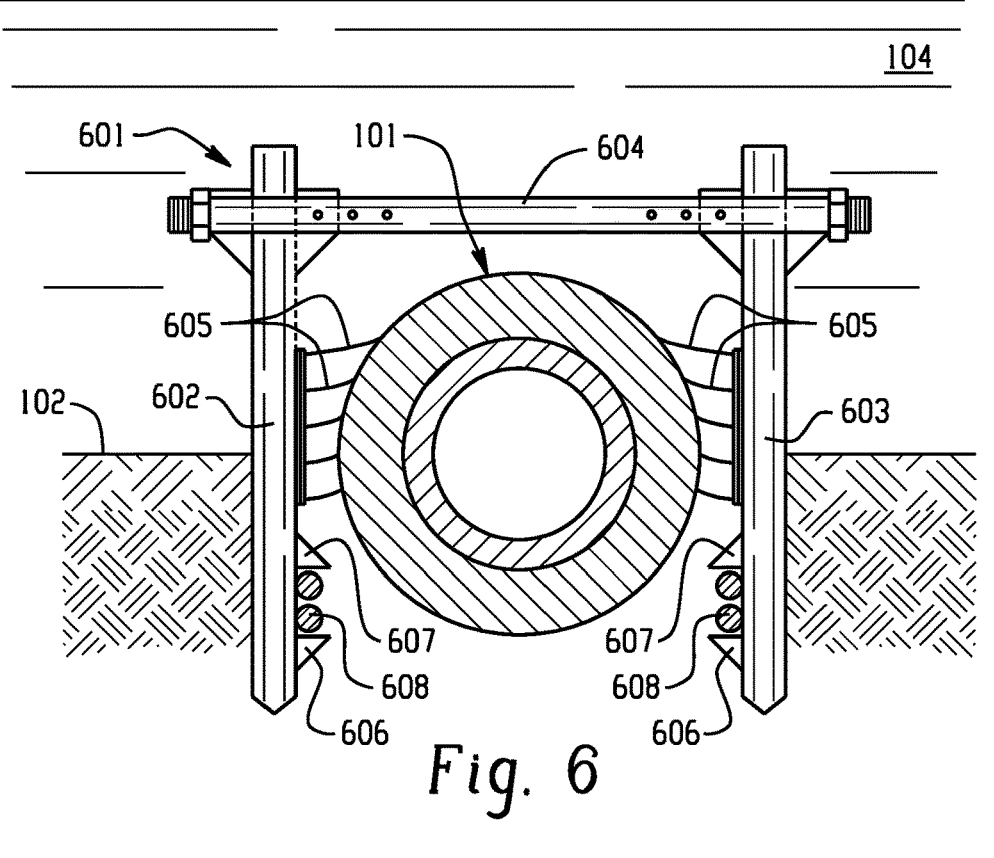
FIG. 6 depicts a cross section of a subsea pipeline with a surrounding insulation structure, in accordance with some embodiments.

FIG. 6 depicts a cross section of a subsea pipeline with a surrounding insulation structure, in accordance with some embodiments. In the example embodiment depicted in FIG. 6, the insulation structure 601 includes a first insulation wall 602 and a second insulation wall 603 placed at opposite sides of the subsea pipeline 101. A portion (e.g., one half or one third) of the first and second insulation walls (602, 603) may be submerged in the seafloor 102. Similarly, a lower half of the subsea pipeline 101 may be submerged in the seafloor 102. A top end of each of the first and second insulation walls (602, 603) may be connected to one another by a spacer segment 604. The spacer segment 604 may be adjustable such that the distance between the first post 602 and the second post 603 can be adjusted.

The first and second insulation walls (602, 603) may each include a lower support notch 606 and an upper support notch 607. One or more heater cables 608 may be positioned in a space between the lower support notch 606 and the upper support notch 607. In the example embodiment depicted in FIG. 6, two heater cables 608 are positioned between the upper and lower support notches (606, 607) of each of the first and second posts (602, 603). As described above with respect to FIG. 2, placing the heater cables 608 near the bottom of the subsea pipeline 101 may result in a conductive heat transfer to the inside of the subsea pipeline 101. The upper and lower support notches (606, 607) may be placed a predetermined distance apart from one another to accommodate a specified number of heater cables 608. The upper and lower support notches (606, 607) may each further include a plurality of heating fins 605 which contact the subsea pipeline 101 when the surrounding insulation structure 601 is installed over the subsea pipeline 101. The heating fins 605 may assist in transferring heat from the heater cables 608 to the subsea pipeline 101.

Figure 7:
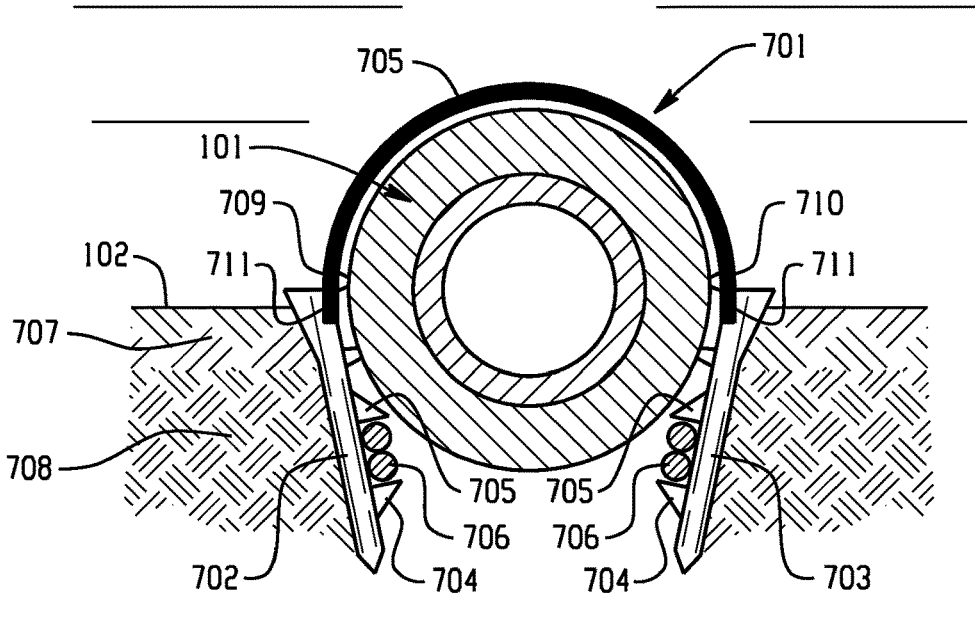
FIG. 7 depicts a cross section of a subsea pipeline with lower heating posts, in accordance with some embodiments.

FIG. 7 depicts a cross section of a subsea pipeline with lower heating posts, in accordance with some embodiments. In the example embodiment depicted in FIG. 7, a first lower heating post 702 and a second lower heating post 703 are embedded in the seafloor 102. As depicted in FIG. 7, the seafloor 102 may include an upper layer 707 and a lower layer 708. The upper layer 707 may be less dense than the lower layer 708. The first and second lower heating posts (702, 703) may each include an upper support notch 705 and a lower support notch 704 for accommodating one or more heater cables 706. In the example embodiment shown in FIG. 7, two heater cables 706 are placed between the upper and lower support notches (704, 705) on each of the first and second lower heating posts (702, 703). As described above with respect to FIG. 2, placing the heater cables 706 near the bottom of the subsea pipeline 101 may result in a conductive heat transfer to the inside of the subsea pipeline 101. The upper and lower support notches (704, 705) and heater cables 706 may be placed in the lower, more dense layer 708 of the seafloor 102.

The first and second lower heating posts (702, 703) may be slightly tilted inwards towards a vertical line extending from a center of the subsea pipeline 101. This orientation of the first and second lower heating posts (702, 703) may be advantageous because it may assist in securing the lower heating posts within the seafloor. For example, the tilted orientation may decrease the ability of an upwards buoyant force to dislodge or remove the lower heating posts (702, 703). Furthermore, the orientation illustrated in FIG. 7 may bring the heater cables 706 closer to the subsea pipeline 101 and thus decrease a heat loss of the heater cables 706 to the surrounding seafloor 102.

An insulating cover 705 may be placed over the subsea pipeline 101 to decrease the flow of heat out of the subsea pipeline 101. The insulating cover 705 may be made of an insulating material (e.g., rubber) and may include a first end 709 coupled to the first lower heating post 702 and a second end 710 coupled to the second lower heating post 703. Each of the first and second lower heating posts (702, 703) may include a notch 711 for accommodating the respective end of the insulating cover 705.

Figure 8:
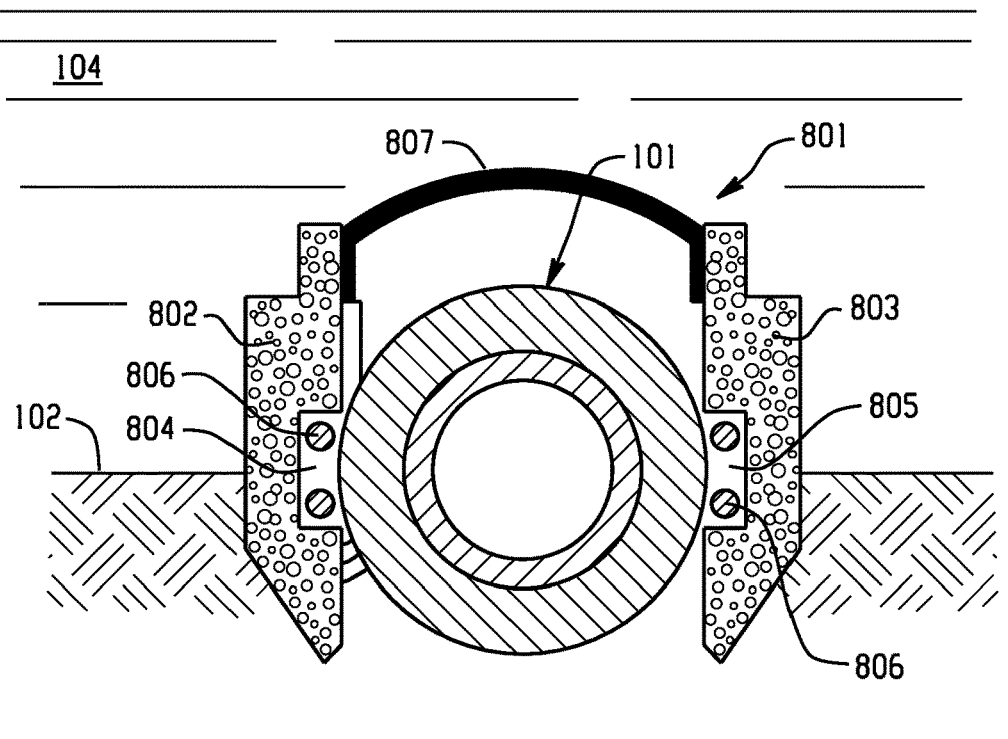
FIG. 8 depicts a cross section of a subsea pipeline with side insulation posts, in accordance with some embodiments.

FIG. 8 depicts a cross section of a subsea pipeline with side insulation posts, in accordance with some embodiments. In the example embodiment of FIG. 8, a first side insulation post 802 and second side insulation post 803 are placed on opposite sides of the subsea pipeline 101. The first and second side insulation posts (802, 803) may be composed of an insulating material (e.g., rubber, foam, or plastic). The first side insulation post 802 may include a first side cavity 804 and the second side insulation post 803 may include a second side cavity 805. One or more heater cables 806 may be placed in each of the first side cavity 804 and the second side cavity 805. The one or more heater cables 806 can thus be used to inject heat into the subsea pipeline 101. Approximately half of each of the subsea pipeline 101 and the surrounding first and second side insulation posts (802, 803) may be embedded within the seafloor 102. An upper insulation bar 807 may be placed above the subsea pipeline 101 and may be attached to an upper end of the first side insulation post 802 and an upper end of the second side insulation post 803. The subsea pipeline with side insulation posts 801 may include a plurality of upper insulation bars 807 placed at multiple locations along the length of the subsea pipeline 101. In other example embodiments, the upper insulation bar 807 is a single component extending along the length of the subsea pipeline 101.

Figure 9:
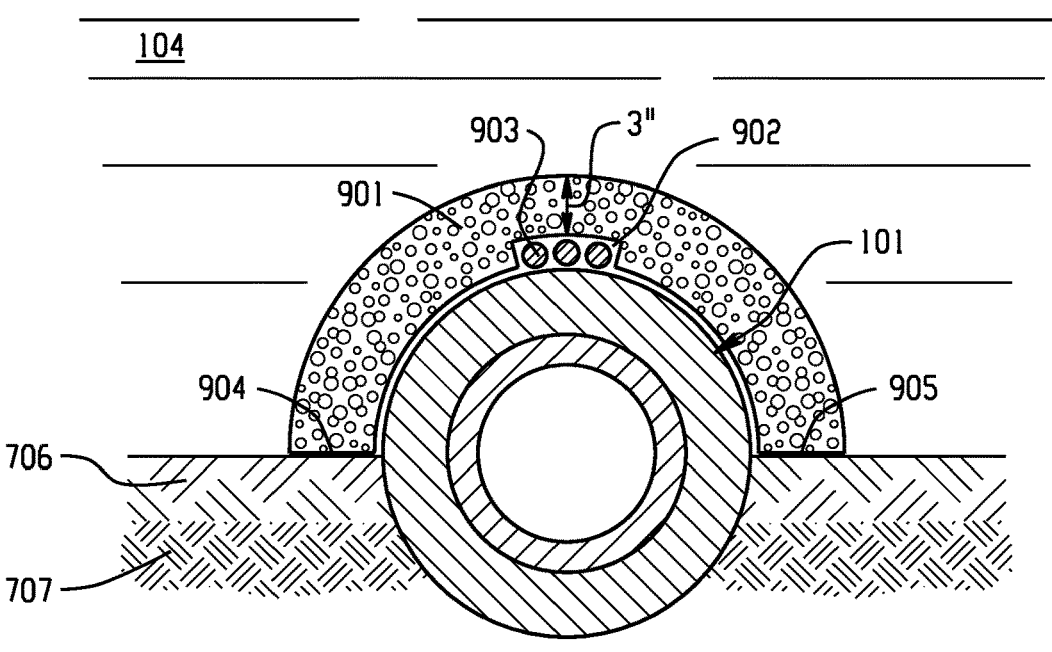
FIG. 9 depicts a cross section of a subsea pipeline with an upper insulation component, in accordance with some embodiments.

FIG. 9 depicts a cross section of a subsea pipeline with an upper insulation component, in accordance with some embodiments. In the example embodiment depicted in FIG. 9, the upper insulation component 901 is shaped in the form of a semi-circle and surrounds a top portion of the subsea pipeline 101. For example, the upper insulation component 901 may surround approximately half of the subsea pipeline 101. The upper insulation component 901 may include a lower cavity 902 placed adjacent to the subsea pipeline 101. One or more heater cables 903 may be placed within the lower cavity 902. In the example embodiment depicted in FIG. 9, three heater cables 903 are placed in the lower cavity 902.

The lower cavity 902 may contain a predetermined length so that the heater cables 903 placed within it can be positioned a predetermined distance apart from each other. A lower portion of the subsea pipeline 101 may be embedded in a lower layer of soil 707 within the seafloor. The lower layer of soil 707 may be relatively compact and dense. The lower portion of the subsea pipeline may also be embedded in an upper layer of soil (e.g., silt) 706 on the seafloor. The upper layer of soil may be relatively loose and less dense than the lower layer of soil. The upper insulation component 901 may include a first end 904 and a second end 905 that are substantially adjacent to the top surface of the upper layer 706 of soil.

Figure 10:
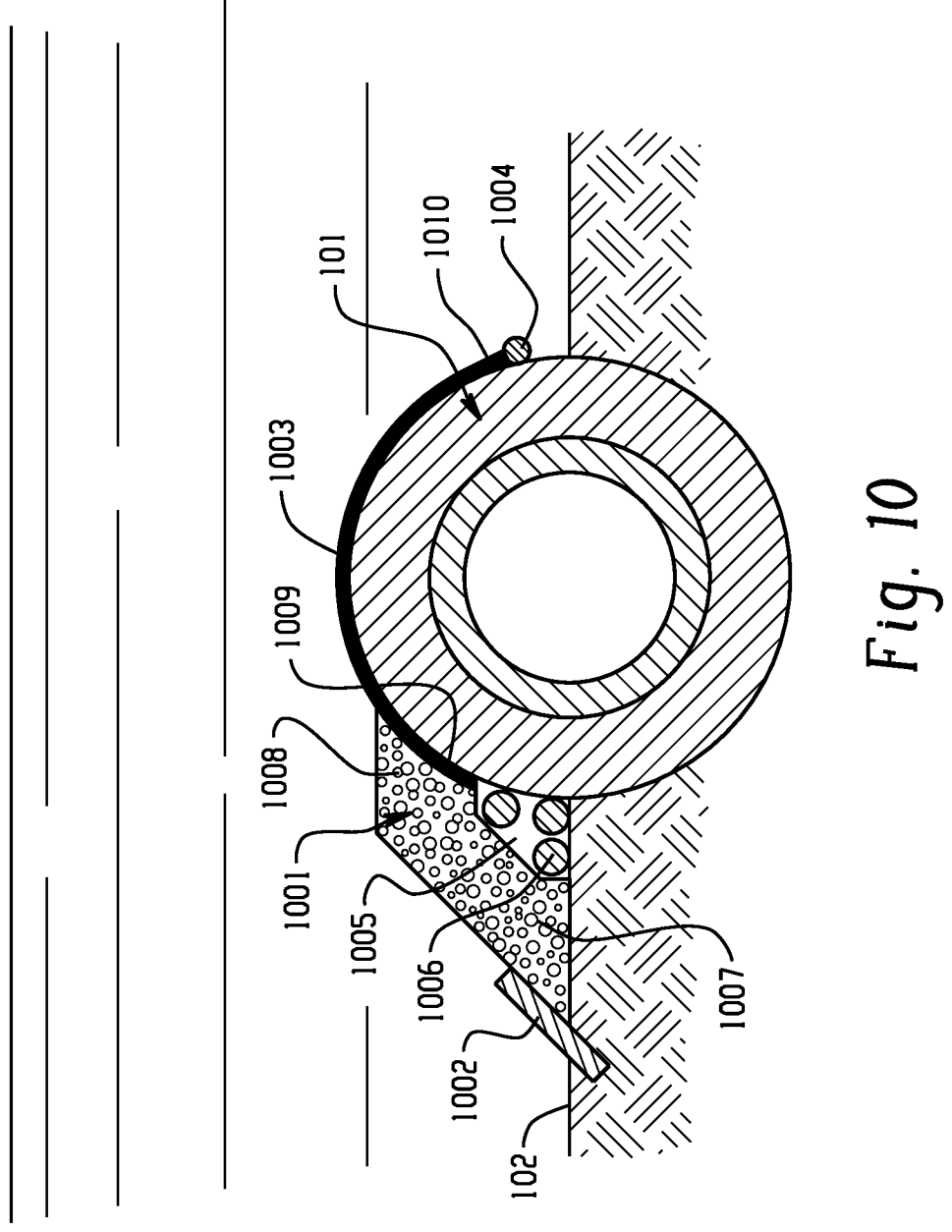
FIG. 10 depicts a cross section of a subsea pipeline with an adjacent side surface insulating element, in accordance with some embodiments.

FIG. 10 depicts a cross section of a subsea pipeline with an adjacent side surface insulating element, in accordance with some embodiments. In the example embodiment depicted in FIG. 10, the adjacent side surface insulating element 1001 is composed of insulating material and is positioned on a first side of the subsea pipeline 101. The adjacent side surface insulating element 1001 may include a first end 1007 adjacent to or embedded in the seafloor 102, and a second end 1008 adjacent to the subsea pipeline 101. A weight plate 1002 may be embedded in the seafloor 102 and may be placed against the first end 1007 of the adjacent side surface insulating element 1001. The weight plate 1002 may secure the adjacent side surface insulating element 1001 to the subsea pipeline 101 and prevent the adjacent side surface insulating element 1001 from slipping. The adjacent side surface insulating element 1001 may be oriented at an angle (e.g., 45 degrees) with respect to the surface of the seafloor 102. The second end 1008 of the adjacent side surface insulating element 1001 may have a curvature that is substantially the same as the outer surface of the subsea pipeline 101, so that the second end 1008 is substantially flush with the subsea pipeline 101.

The adjacent side surface insulating element 1001 may form a cavity 1005 adjacent to the seafloor 102 and the subsea pipeline 101. One or more heater cables 1006 may be placed within the cavity 1005 and utilized to heat the subsea pipeline 101. An insulating cover 1003 may be attached to the adjacent side surface insulating element 1001. A first end 1009 of the insulating cover 1003 may be coupled to the second end 1008 of the adjacent side surface insulating element 1001 and surround an upper side of the subsea pipeline 101. The insulating cover 1003 may be composed of insulating material (e.g., rubber). A weight cable 1004 may be coupled to a second end 1010 of the insulating cover 1003 and may be used to prevent the insulating cover 1003 from becoming loose or detached from the subsea pipeline 101. In some example embodiments, a heater cable may be employed as the weight cable 1004.

Figures 11A, 11B:
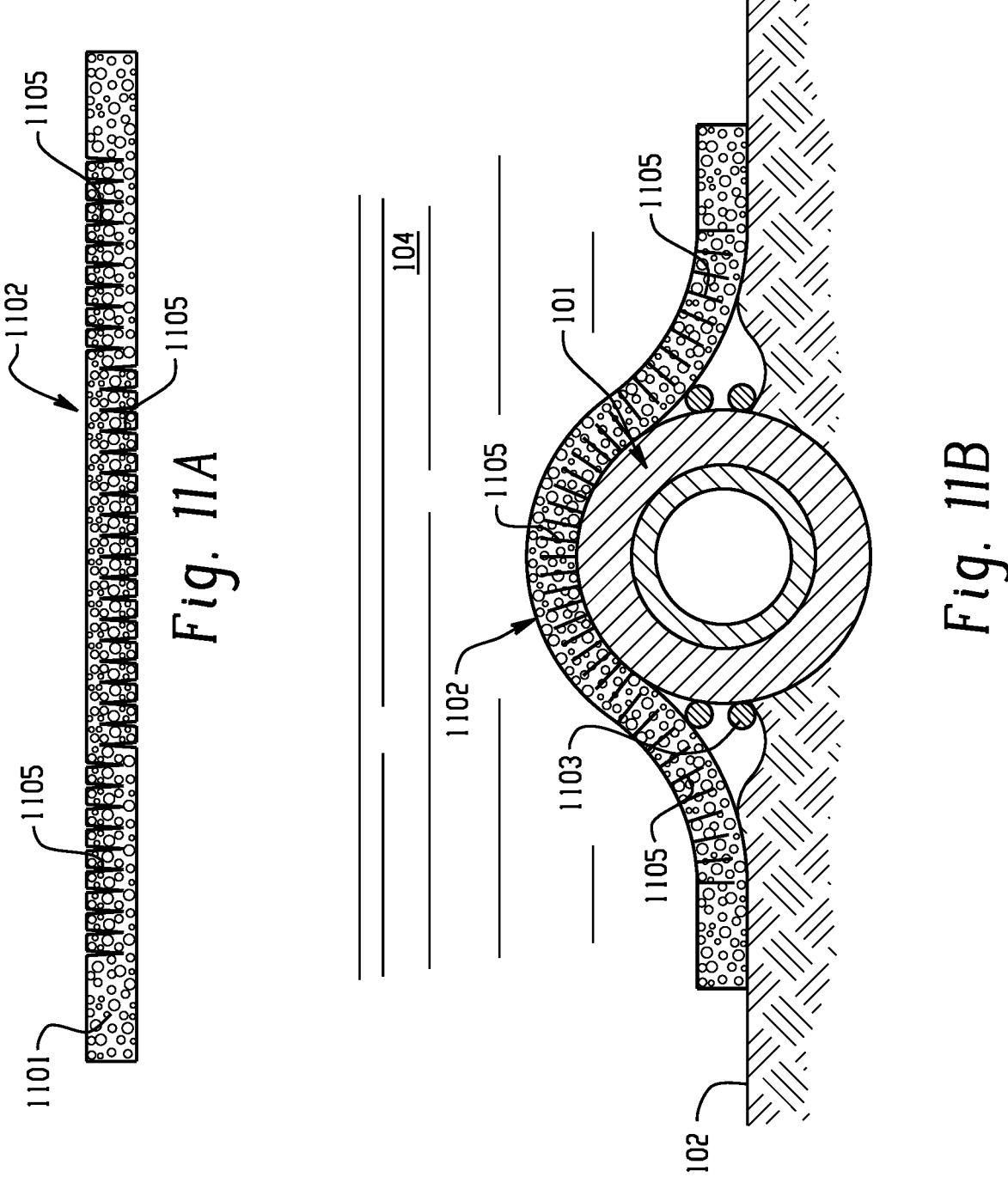
FIG. 11A depicts a cross section of a covering insulation layer, in accordance with some embodiments.
FIG. 11B depicts a cross section of a subsea pipeline with a covering insulation layer, in accordance with some embodiments.

FIG. 11A depicts a cross section of a covering insulation layer, in accordance with some embodiments. In the example embodiment depicted in FIG. 11A, the insulation layer 1102 includes a plurality of notches 1105. The insulation layer 1102 may include a plurality of bottom notches on a middle portion of the insulation layer 1102 and a plurality of top notches on outer portions of the insulation layer 1102. The top and bottom notches may facilitate the profile of the insulation layer 1102 to surround the subsea pipeline 101, as shown in FIG. 11B.

FIG. 11B depicts a cross section of a subsea pipeline with a covering insulation layer, in accordance with some embodiments. In the example embodiment depicted in FIG. 11, the subsea pipeline 101 is covered by the insulation layer 1102 with a plurality of notches 1105. The top notches on the outer portions of the insulation layer 1102 may facilitate the ability of the insulation layer 1102 to curve from the top of the pipeline 101 to a substantially flat portion of the seafloor 104. Heater cables 1103 may be placed in a space between the pipeline 101, the insulation layer 1102, and the seafloor 102. This space may be filled with soil from the seafloor 102, or may be filed with seawater 104.

Figures 12A, 12B:
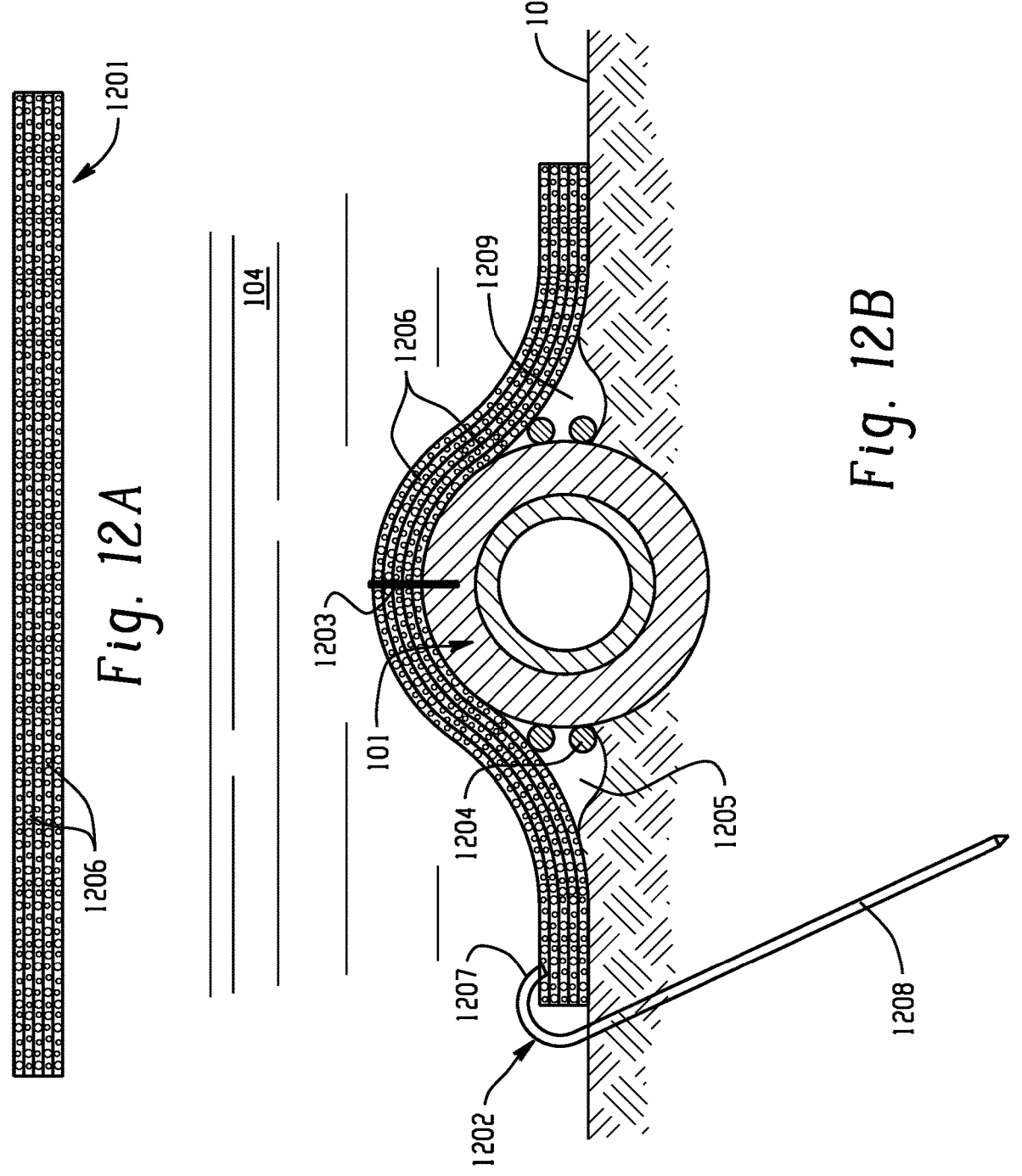
FIG. 12A depicts a cross section of a surrounding insulation cover with insulation layers, in accordance with some embodiments.
FIG. 12B depicts a cross section of a subsea pipeline with surrounding insulation layers, in accordance with some embodiments.

FIG. 12A depicts a cross section of a surrounding insulation cover with insulation layers, in accordance with some embodiments. In the example embodiment depicted in FIG. 12A, the insulation cover 1201 includes a plurality of insulation layers 1206 (e.g., laminations). The insulation layers 1206 may be composed of, for example, silicone rubber. Silicone may be relatively light when submerged in seawater 104 when considering the upwards buoyant force exerted by the seawater 104 on the insulation layers 1206. For example, silicone rubber may weight about 67.4 pounds per cubic foot, while seawater 104 may weigh approximately 65 pounds per cubic foot. In such a case, the net weight of the silicone rubber insulation layers 1206 may be approximately 2.4 pounds per cubic foot when submerged in seawater 104.

FIG. 12B depicts a cross section of a subsea pipeline with surrounding insulation layers, in accordance with some embodiments. In the example embodiment depicted in FIG. 12B, a bottom portion (e.g., a bottom third or a bottom half) of the subsea pipeline 101 is embedded in the seafloor 102. A top portion (e.g., a top two-thirds or a top half) of the subsea pipeline 101 may be positioned above the seafloor 102. A top securing element (e.g., a nail, screw, or pin) 1203 may be used to secure the insulation layers 1206 to the top of the subsea pipeline 101. For example, the top securing element 1203 may pierce through the insulation layers 1206 and into the top of the subsea pipeline 101, preventing or impeding the insulation layers 1206 from moving relative to the subsea pipeline 101.

Additionally or alternatively, a side securing element (e.g., a stake) 1202 may be used to secure a side of the insulation layers 1206 to the seafloor 102. The side securing element 1202, for example, may be in the shape of a cane. A first end 1207 of the side securing element 1202 may make contact with a top portion of the insulation layers 1206. A second end 1208 of the side securing element 1202 may be pierced or embedded in the seafloor 102. The side securing element 1202 may be oriented at an angle (e.g., 15 or 20 degrees) with respect to a vertical line. As described above with respect to FIG. 7, this tilted orientation may decrease the ability of an upwards buoyant force to dislodge or remove the side securing element 1202.

The curvature of the insulation layers 1206 between the top of the subsea pipeline 101 and the seafloor 102 may form a first space 1205 and a second space 1209 located adjacent to the subsea pipeline 101 and between the seafloor 102 and the insulation layers 1206. One or more heater cables 1204 may be placed in the first space 1205 and the second space 1209. In the example embodiment depicted in FIG. 12B, two heater cables 1204 are placed in each of the first and second spaces (1205, 1209). The first and second spaces (1205, 1209) may allow the heater cables 1204 to be in close proximity to the subsea pipeline 101. The first and second spaces (1205, 1209) may be occupied by soil from the seafloor 102, or may be occupied by seawater 104. The insulation layers 1206 may prevent heat from the heater cables 1204 from being wasted into the surrounding seawater 104. Furthermore, the insulation layers 1205 may slow the rate at which heat exits the subsea pipeline 101.

FIG. 13 depicts a method, in accordance with some embodiments. The example method 1300 depicted in FIG. 13 includes a first step 1301 of surrounding a portion of a subsea pipeline with an insulating layer, the insulating layer including a cavity adjacent to the subsea pipeline. The method 1300 may include a second step 1302 of placing a first heater cable in the space, soil from a seafloor positioned within the space between the first heater cable and the subsea pipeline. The method 1300 may include a third step 1303 of heating the first heater cable to a first predetermined temperature based on a melting point of hydrate formations or wax formations within the subsea pipeline. The method 1300 may include a fourth step 1304 of limiting the first heater cable to a second predetermined temperature based on a temperature limit of a coating or insulation of the subsea pipeline.

It will be appreciated by those skilled in the art that changes could be made to the embodiments described above without departing from the broad inventive concept thereof.

It is understood, therefore, that the invention disclosed herein is not limited to the particular embodiments disclosed, and is intended to cover modifications within the spirit and scope of the present invention.

What is claimed is:

1. An insulation cover configured to surround a subsea pipeline, the insulation cover comprising:
   a first side portion and a second side portion, each of the first side portion and the second side portion including a lower end configured to extend into a seafloor and an upper end configured to be positioned above the seafloor;
   a top portion extending between the upper end of the first side portion and the upper end of the second side portion, the top portion and the first side portion forming a first cavity, the top portion and the second side portion forming a second cavity,
   wherein a plurality of heater cables are positioned at an interior of the insulation cover, the plurality of heater cables configured to heat a fluid within the subsea pipeline; and
   a plurality of heater cable brackets, each of the heater cable brackets configured to secure one or more of the plurality of heater cables to an inner surface of the insulation cover,
   wherein the plurality of heater cable brackets includes a heater cable bracket at the lower end of the first or second side portions that is configured to be embedded in the seafloor.

2. The insulation cover of claim 1, wherein the plurality of heater cable brackets includes a heater cable bracket positioned in the first cavity and a heater cable bracket positioned in the second cavity.

3. The insulation cover of claim 1, wherein the plurality of heater cables are configured to exceed a first predetermined temperature and limited to a second predetermined temperature, the first predetermined temperature based on a melting point of hydrate or wax formations within the subsea pipeline and the second predetermined temperature based on a temperature limit of a coating or insulation of the subsea pipeline.

4. The insulation cover of claim 1, wherein an outer surface of one or more of the plurality of heater cable brackets is positioned a first predetermined distance from an outer surface of the subsea pipeline, the first predetermined distance forming a region of heated water between the outer surface of the heater cable bracket and the outer surface of the subsea pipeline.

5. A heating system for a subsea pipeline including a lower portion embedded in a seafloor and an upper portion above the seafloor, the heating system comprising:
   an insulating layer including a middle portion covering the upper portion of the subsea pipeline, the insulating layer further including an end portion covering the seafloor, the insulating layer forming a cavity adjacent to the seafloor, the subsea pipeline, and the insulating layer; and
   a plurality of heater cables within the cavity, the plurality of heater cables configured to heat a fluid within the subsea pipeline, the plurality of heater cables separated from the subsea pipeline only by seawater or by soil of the seafloor within the cavity,
   wherein the insulating layer comprises a plurality of baffled chambers configured to be inflated and deflated.

6. The heating system of claim 5, wherein the middle portion of the insulating layer comprises a plurality of bottom notches permitting the middle portion to conform to the upper portion of the subsea pipeline.

7. The heating system of claim 6, wherein the end portion of the insulating component comprises a plurality of notches permitting the insulating component to bend from the upper portion of the subsea pipeline to the seafloor.

8. The heating system of claim 5, wherein the insulating layer comprises a plurality of lamination layers.

9. The heating system of claim 5, further comprising a stake configured to secure the insulating layer to the seafloor, the stake including a first end positioned on a top of the end portion of the insulating layer and a second end embedded in the seafloor.

10. A heating system for a subsea pipeline including a lower portion embedded in a seafloor and an upper portion above the seafloor, the heating system comprising:

an insulating layer including a middle portion covering the upper portion of the subsea pipeline, the insulating layer further including an end portion covering the seafloor, the insulating layer forming a cavity adjacent to the seafloor, the subsea pipeline, and the insulating layer;

a plurality of heater cables within the cavity, the plurality of heater cables configured to heat a fluid within the subsea pipeline, the plurality of heater cables separated from the subsea pipeline only by seawater or by soil of the seafloor within the cavity; and a top securing element configured to secure the insulating layer to the subsea pipeline, the top securing element placed through the insulating layer and into the subsea pipeline.

11. The heating system of claim 5, wherein the insulating layer does not include a conductive layer.

12. The system of claim 5, wherein the baffled chambers are filled with nitrogen when the baffled chambers are inflated.

13. A method comprising:

surrounding a portion of a subsea pipeline with an insulating layer, the insulating layer including a space adjacent to the subsea pipeline;

placing a first heater cable in the space;

inflating a plurality of baffled chambers within the insulating layer;

heating the first heater cable to a first predetermined temperature based on a melting point of hydrate formations or wax formations within the subsea pipeline; and limiting the first heater cable to a second predetermined temperature based on a temperature limit of a coating or insulation of the subsea pipeline.

14. The method of claim 13, further comprising placing a second heater cable in the space, the second heater cable placed a predetermined distance from the first heater cable, the predetermined distance between the first heater cable and the second heater cable forming a heating chamber adjacent to the subsea pipeline.

15. The method of claim 14, wherein the heating chamber prevents overheating of an outer coating of the subsea pipeline.

16. A method comprising:

surrounding a portion of a subsea pipeline with an insulating layer, the insulating layer including a space adjacent to the subsea pipeline;

placing a first heater cable in the space;

surrounding the insulating layer with a rubber cover and securing the insulating layer to the subsea pipeline by attaching a cable weight to the rubber cover;

heating the first heater cable to a first predetermined temperature based on a melting point of hydrate formations or wax formations within the subsea pipeline; and limiting the first heater cable to a second predetermined temperature based on a temperature limit of a coating or insulation of the subsea pipeline.

17. The heating system of claim 10, wherein the middle portion of the insulating layer comprises a plurality of bottom notches permitting the middle portion to conform to the upper portion of the subsea pipeline.

18. The heating system of claim 17, wherein the end portion of the insulating component comprises a plurality of notches permitting the insulating component to bend from the upper portion of the subsea pipeline to the seafloor.

19. The heating system of claim 10, wherein the insulating layer comprises a plurality of lamination layers.

20. The heating system of claim 10, further comprising a stake configured to secure the insulating layer to the seafloor, the stake including a first end positioned on a top of the end portion of the insulating layer and a second end embedded in the seafloor.

21. The heating system of claim 10, wherein the insulating layer does not include a conductive layer.

* * * * *